(12) United States Patent
Ito et al.

(10) Patent No.: US 6,341,804 B1
(45) Date of Patent: Jan. 29, 2002

(54) SLIP-OUT PREVENTIVE UNIT OF SUPPLY EXHAUST PIPE

(75) Inventors: Shuji Ito; Jiro Takahashi; Tomohiko Oka, all of Tokyo (JP)

(73) Assignee: Tosetz Co., LTD (JP)

( * ) Notice: Subject to any disclaimer, the term of this patent is extended or adjusted under 35 U.S.C. 154(b) by 0 days.

(21) Appl. No.: 09/443,725

(22) Filed: Nov. 19, 1999

(30) Foreign Application Priority Data

Nov. 20, 1998 (JP) ............................................. 10-331186
Apr. 19, 1999 (JP) ............................................. 11-111416

(51) Int. Cl.$^7$ ................................................. F16L 37/08
(52) U.S. Cl. ........................... 285/81; 285/84; 285/307; 285/319
(58) Field of Search ............................... 285/7, 81, 84, 285/85, 307, 319

(56) References Cited

U.S. PATENT DOCUMENTS

| | | | | |
|---|---|---|---|---|
| 832,757 | A | * 10/1906 | Stirzaker | 285/307 |
| 3,731,955 | A | * 5/1973 | Borsum et al. | 285/307 |
| 4,181,331 | A | * 1/1980 | Cowan | 285/307 |
| 4,398,757 | A | * 8/1983 | Floyd et al. | 285/322 |
| 4,610,468 | A | * 9/1986 | Wood | 285/307 |
| 5,004,272 | A | * 4/1991 | Kipp | 285/307 |
| 5,125,694 | A | * 6/1992 | Gobbi | 285/307 |
| 5,332,266 | A | * 7/1994 | Canale | 285/7 |
| 5,380,051 | A | * 1/1995 | Breuhan | 285/307 |
| 5,855,399 | A | * 1/1999 | Profunser | 285/307 |
| 5,954,370 | A | * 9/1999 | Pieterson | 285/84 |

FOREIGN PATENT DOCUMENTS

| | | | | |
|---|---|---|---|---|
| CA | 548218 | * 11/1957 | | 285/84 |
| GB | 1191438 | * 5/1970 | | 285/307 |

* cited by examiner

*Primary Examiner*—Eric K. Nicholson
(74) *Attorney, Agent, or Firm*—McGlew and Tuttle, P.C.

(57) ABSTRACT

A slip-out preventive unit of a supply exhaust pipe assembly with a supply exhaust pipe forming a faucet at one end and forming an insertion port at the other end. The faucet having a cut window to allow the lock portion of a lock member to pass through the faucet to engage a circumferential groove of the insertion port. A slip-out prevention unit of which the lock member is a component, to guide and constrain the lock member to engage the circumferential groove, resulting in the holding of the insertion port within the faucet preventing unwanted separation after connection of the assembly. A slide guide allows movement of the lock member in an axial direction of the faucet where the tip of the lock member may be constrained from radial movement of the engagement portion of the lock member by a locking bag wall upon an attempt to separate the insert portion from the faucet. The insert portion being insertable and removable of the faucet when the lock member is in a withdrawn position relative to the locking bag wall, thus allowing the engagement portion of the lock member to be radially displaced by the end of the insertion port or the slope of the circumferential groove of the insert port as it is inserted or removed from the faucet respectively. The locking member being moved to its withdrawn position either by direct force acting upon the lock member from the insertion port as it is inserted into the faucet for connection of the unit, or by an external operator applied force against the lock member prior to removal of the insertion port from the faucet.

6 Claims, 9 Drawing Sheets

SLIP-OUT PREVENTIVE UNIT OF SUPPLY EXHAUST PIPE

FIELD OF THE INVENTION

The present invention relates to a unit for the prevention slip-out when a supply exhaust pipe of a regular size is connected, where a faucet has been formed on one side of the unit and an insertion port has been formed on the other end of the unit.

BACKGROUND OF THE INVENTION

In case of the supply exhaust pipe (including a single pipe or a dual pipe) for a combustion device or in case of the supply exhaust pipe for introduction and exhaust of atmosphere, it is general to add the pipe that has been previously fabricated to a certain length to another pipe for elongating the piping. If the pipes have been laid out according to this kind of work execution method, usually the slip-out preventive unit is provided for every piping member so that the supply exhaust pipe may not slip down at the connected portion.

FIGS. 10 (a) and (b) are an example of this slip-out preventive unit, an elastic claw plate 2 is mounted towards the innermost direction on the inner face of faucet 1 in this unit, and the elastic claw plate 2 gets engaged inside the circumference groove on the side of insertion port 3 to prevent the slip-out when the side of insertion port 3 of another pipe has been inserted into the stipulated position as shown in (b).

This slip-out unit is the most simple type, but if the angle of the elastic claw plate 2, the shape of circumference groove 4 and the clearance between the inside diameter of faucet 1 and the outside diameter of insertion port, etc. should not be adequate, the strength against the pullout becomes smaller, and the stable strength can not sometimes be obtained. Further, this slip-out preventive unit needs to once turn the pipe and mate the elastic claw plate 2 to the groove 5 for pullout, and the pullout is troublesome when pulling out the pipe.

FIGS. 11 (a) and (b) show another slip-out preventive unit. This unit not only forms the wire accommodating groove 6 on the side of faucet 1, but also accommodates a lock wire 7 of a C-letter shape inside this wire accommodating groove such that there is coincidence between the accommodating groove 6 with the circumference groove 4 formed on the side of insertion port 3 when the side of insertion port 3 has been inserted into the stipulated position. This makes the lock wire 7 engage with both the accommodating groove 6 and the circumference groove 4, for preventing the pullout if the lock wire 7 should be shrunk in diameter utilizing the metal 8 on the outside of faucet 1 under this situation.

This unit arrangement has merit where the slip-out acts on approximately all the circumference of the pipe. However, this has a problem that the pipe can not be attached or detached with a one-touch action because there is the need for shrinking or expanding the diameter of lock wire 7 on each occasion of attaching and detaching the pipe, or controlling the metal 8.

SUMMARY AND OBJECTS OF THE INVENTION

It is an object of the present invention to address the problems of the prior art.

Another object of this invention is to provide a slip-out preventive unit of a supply exhaust pipe where the slip-out works only by inserting the insertion port against the faucet, wherein stable strength can be maintained against the pullout once inserted in this way, and moreover the once connected pipe can be pulled out with a one-touch operation without turning the pipe.

If the insertion port side should be inserted into the faucet when connecting the pipes according to some of the embodiments of the invention, the lock member retracts together with the part, and the lock portion of the lock member gets in touch with the brim of cut window and stops there. If the insertion port should be moreover inserted, the lock portion of the lock member rides on the outer circumference face of insertion port, once escapes from the cut window, then if the insertion port should be inserted into the stipulated position, the lock portion coincides with the circumference groove on the side of insertion port, falls down into and fits into the circumference groove due to its elasticity action. If the pipe should be pulled a bit under this status, the lock member is pulled together and slides forward, and the tip of engagement portion collides against the locking bag wall and stops there. Or, the horizontal end of lock portion enters into the cut window and stops there. This status is the locked state, and if the force of pullout direction should act on the pipe under this situation, the force in the pullout direction also acts on the lock member together with the pipe. Because the tip of the engagement portion is retained with the locking bag wall, a wedge effect acts on the lock portion, and this lock portion fits strongly into the circumference groove.

In case of pulling out the pipe, the insertion port side shall once be pushed into for retracting the lock member and for escaping its engagement portion from the locking bag wall, and after this, if the insertion port side should be pulled while retaining the stopper at the rear end of lock member with the finger tips, the insertion port side can be pulled out easily because the lock portion is raised along the brim of circumference groove and escapes to the outside of cut window.

If the insertion port side should be inserted into the faucet when connecting the pipes according to some of the other embodiments of the invention, the lock member retracts together with the part, and the lock portion of lock member gets in touch with the brim of cut window, or the control portion gets in touch with the inlet of the cover and stops there. If the insertion port side should be further inserted, the lock portion of lock member rides on the outer circumference face of insertion port, once escapes upward from the cut window due to the action of escape space formed inside the cover. After this, if the insertion port should be inserted into the stipulated position, the lock portion coincides with the circumference groove on the side of insertion port and falls down into the circumference groove with the elasticity action of lock member, and the lock portion fits into the position. If the pipe should be pulled a bit under this state, the lock member is pulled together and slides, and the engagement portion formed to the tip of lock portion collides against the lock wall and stops there. This state is the locked state, and if the force in pullout direction should act on the pipe under this situation, the force in the pullout direction also acts on the lock member together with the pipe. Because the engagement portion formed to the tip of lock portion is retained by the lock wall at this time, the wedge effect acts on the lock portion, and the lock portion fits strongly into the circumference groove and prevents the withdrawal.

When pulling out the pipe, the insertion port side of pipe shall be pushed once in a bit for retreating the lock member into the cover and for escaping the engagement portion from the lock wall, then the insertion port side should be pulled while retaining the control portion of lock member with the finger tips. As the lock portion is raised along the brim of the circumference groove and escapes into the escape space from the cut window, the insertion port side can be pulled out easily as it is.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
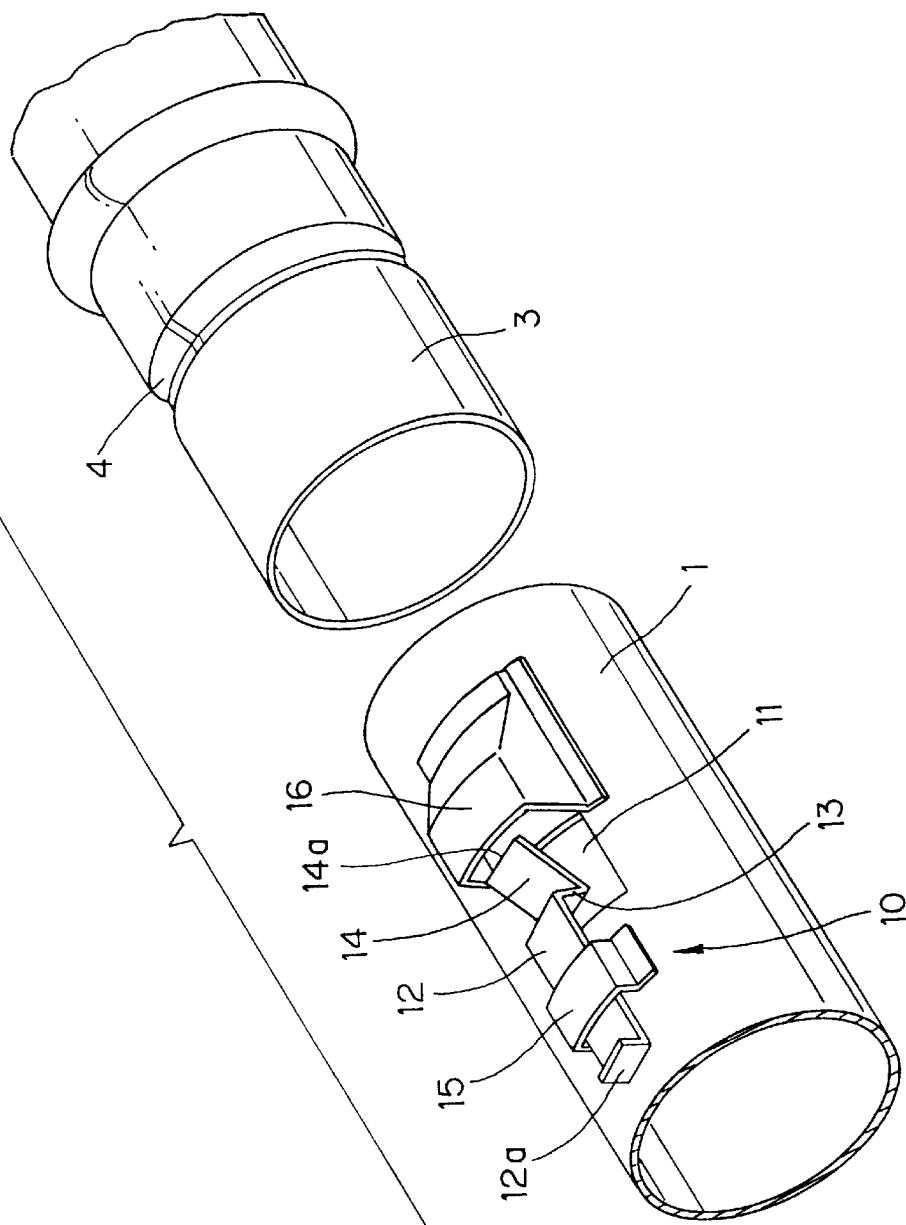
FIG. 1 is an explanatory view of slip-out preventive unit relating to a first embodiment of the invention.

A first embodiment concrete structure and operation mode example is shown in FIG. 1 and FIG. 2. FIG. 1 shows a slip-out preventive unit 10 relating to this invention. This unit 10 not only provides the cut window 11 on the side of faucet 1, but also mounts the lock portion 13 for a free slide and a free fall in the center direction of pipe from the cut window 11 to the outside of this cut window 11. An elasticity lock member 12 forms the engagement portion 14, to the tip side from the lock portion 13. The unit 10 also has a locking bag wall 16 for engaging the tip 14a of said engagement portion 14 from the inside and for preventing it from escaping in the radial direction under the situation where the lock member 12 slides toward the pipe end direction and the lock portion 13 of this lock member 12 falls down into the center direction of pipe from the said cut window 11. In FIG. 1 the slide guide mounting 15 is provided on the surface of pipe 15 for the free slide of the lock member 12. A stopper 12a is formed to the rear end of lock member 12. The lock portion 13 of lock member 12 presents a V-letter shape in the first embodiment as shown. However, the lock portion may also be a ⌴shape or U-letter shape, and this shape is not especially limited to a specific configuration.

The circumference groove 4 is formed on the side of insertion port 3, and this structure per se is identical to the structure of a conventional insertion port. The cut window 11 is positioned inside and the lock portion 13 of said lock member 12 and is engaged when the insertion port 3 side is inserted into the stipulated position inside the faucet 1 of another pipe. Further, in case of this embodiment, the circumference groove 4 is shaped to a reversed trapezoid, but may be a semi-circular shape.

The connection and pullout example of the pipe in this embodiment is to be explained with reference to FIG. 2.

Figure 2A:
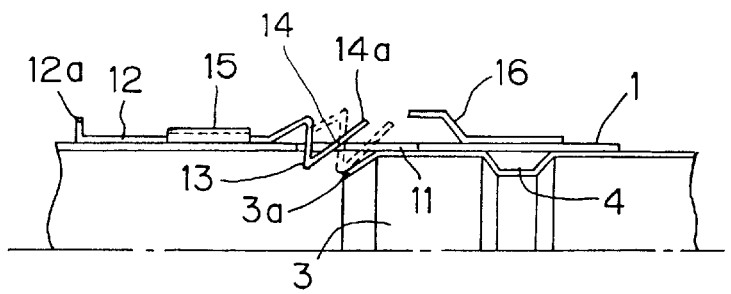
FIG. 2(a) is an explanatory view of the action of slip-out preventive unit relating to the first embodiment of the invention as the insertion port is inserted into the faucet.
Figure 2B:
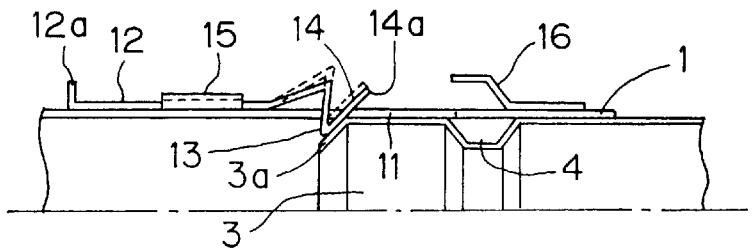
FIG. 2(b) is an explanatory view of the action of slip-out preventive unit relating to the first embodiment of the invention as the engagement portion of the lock member is displaced in a radial direction.
Figure 2C:
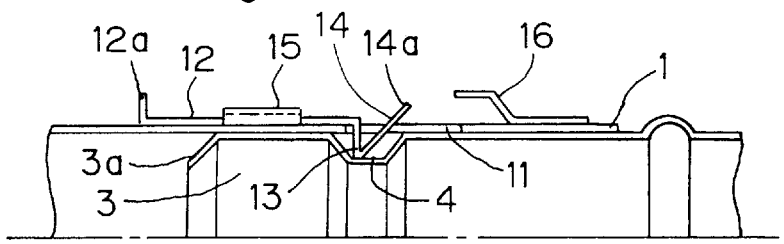
FIG. 2(c) is an explanatory view of the action of slip-out preventive unit relating to the first embodiment of the invention where the engagement portion of the lock member has engaged the circumferential groove of the insertion port.
Figure 2D:
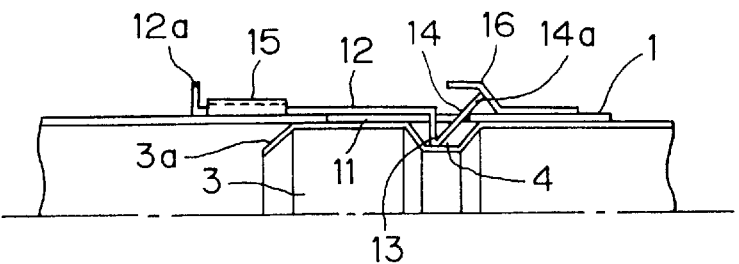
FIG. 2(d) is an explanatory view of the action of slip-out preventive unit relating to the first embodiment of the invention after the insertion port has been drawn back from the faucet engaging the lock member tip under the locking bag wall.

First, when connecting the pipes, the insertion port 3 side of another pipe shall be inserted into the faucet 1 as it is, then the tip 3a of insertion port 3 is engaged with the lock portion 13 of lock member 12 (the dot line of FIG. 2(a)). If the part should be pushed as it is, the lock member 12 retracts together with it, and the lock portion 13 gets in touch with the brim of cut window 11 and stops there (the solid line of FIG. 2(a)). If the side of insertion port 3 should be further inserted, the lock portion 13 is pushed up by the tip 3a of insertion port 3 and escapes to the outside of cut window 11 (the dot line of FIG. 2(b)). Also, if the insertion port 3 should be inserted into the stipulated position, the circumference groove 4 mates below the lock portion 13, and the lock portion 13 drops into the circumference groove 4 due to its elasticity action (FIG. 2(c)). The connection may be all right as it is, but the insertion port 3 side is pulled a bit for sliding the lock member 12 together and for entering the engagement portion 14 into the locking bag wall 16, and the tip 14a gets in contact with the locking bag wall 16. In this arrangement, because the tip 14a of engagement portion 14 is retained by the locking bag wall 16 when the force in pullout direction should be applied to the pipe, the wedge effect acts on the lock portion 13, and its fitting relation with the circumference groove 4 can be strengthened (FIG. 2(d)).

Figure 2E:
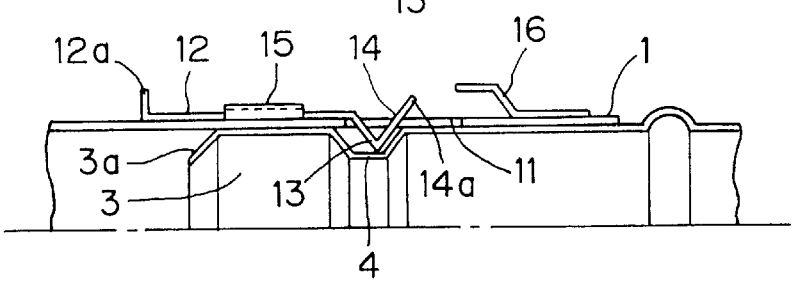
FIG. 2(e) is an explanatory view of the action of slip-out preventive unit relating to the first embodiment of the invention where the lock member has been retracted releasing the lock member tip from the radial restraint of the locking bag wall.
Figure 2F:
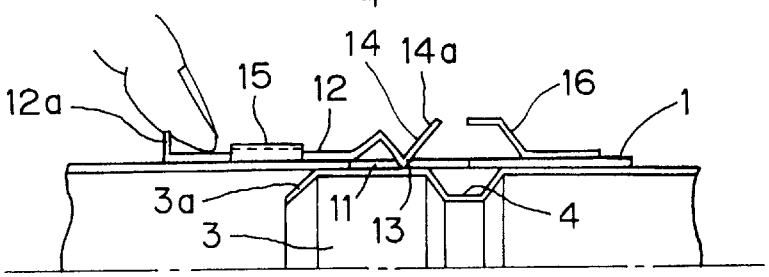
FIG. 2(f) is an explanatory view of the action of slip-out preventive unit relating to the first embodiment of the invention where the lock member is being restrained from being drawn under the locking bag wall to allow removal of the insertion tip from the faucet.
Figure 3A:
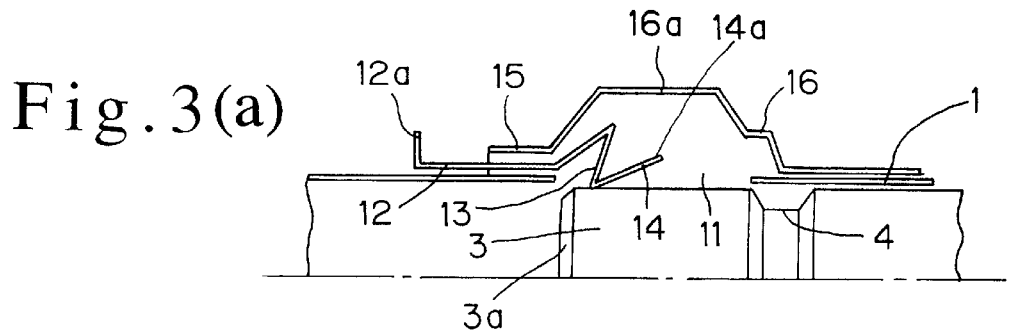
FIG. 3(a) is an explanatory view of a second embodiment of the invention where the insertion port has been inserted into the faucet enough to displace the engagement portion of the lock member in a radial direction.
Figure 3B:
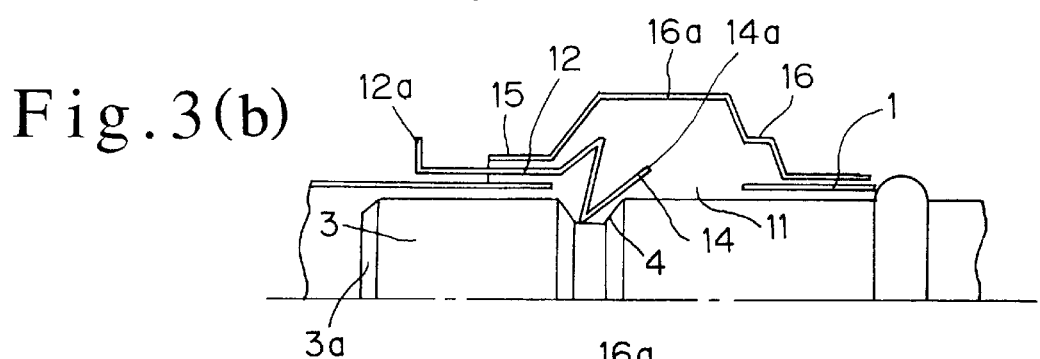
FIG. 3(b) is an explanatory view of a second embodiment of the invention where the engagement portion of the lock member has engaged the circumferential groove of the insertion port.
Figure 3C:
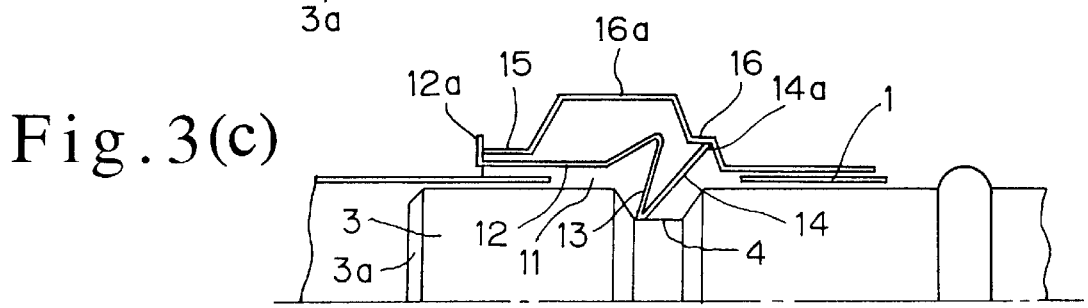
FIG. 3(c) is an explanatory view of a second embodiment of the invention after the insertion port has been drawn back from the faucet engaging the lock member tip under the locking bag wall.
Figure 3D:
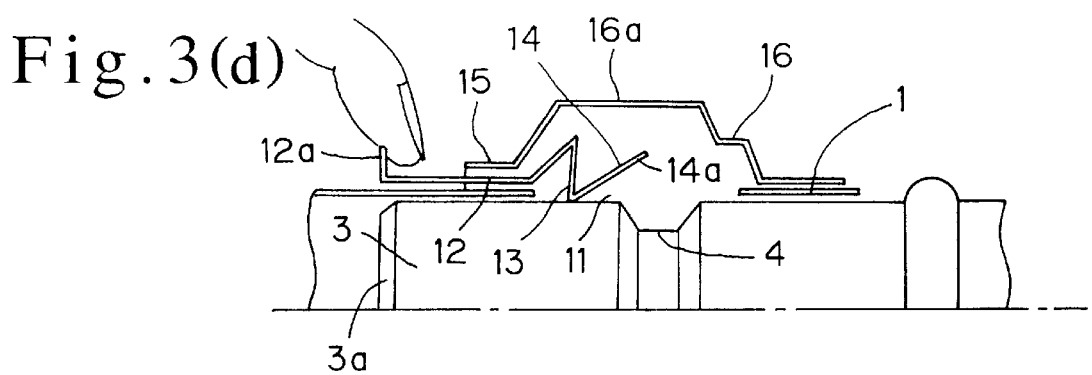
FIG. 3(d) is an explanatory view of a second embodiment of the invention where the lock member is restrained from being drawn under the locking bag wall to allow removal of the insertion tip from the faucet.

In case of pulling out the pipe, the tip 14a of engagement portion 14 escapes from the locking bag wall 16 by once pushing in the insertion port 3 side and retracting the lock member 12 together as shown in FIG. 2(e). After that, if the stopper 12a of lock member 12 is retained with the finger tips and the insertion port 3 side is pulled, the lock portion 13 is raised along the brim of circumference groove 4 and escapes to the outside of cut window 11. As a result, the pipe can be pulled out easily as it is.

The second embodiment of the invention not only forms integrally the escape space (cover) 16a in front of the locking bag wall 16, but also integrates the slide guide 15, covers the lock member 12 and the cut window 11 from the outside for improving the outside appearance, and substantially remains unchanged as to the first embodiment of the invention. In FIG. 3, the same symbols as those of FIG. 2 indicate the same portions and have the same functions, so further explanations are omitted.

In FIG. 3, the view (a) is the status where the insertion port 3 has been inserted into the faucet 1, the view (b) is the insertion end status, the view (c) is the status where the pullout force acts on the pipe, the tip 14a of engagement portion 14 is retained by the locking bag wall 16, the wedge effect acts on the lock portion 13 and the slip-out preventive force has been raised, and the view (d) is the status where the insertion port 3 side is pulled out while retaining the stopper 12a of lock member 12 with the finger tips.

Figure 4A:
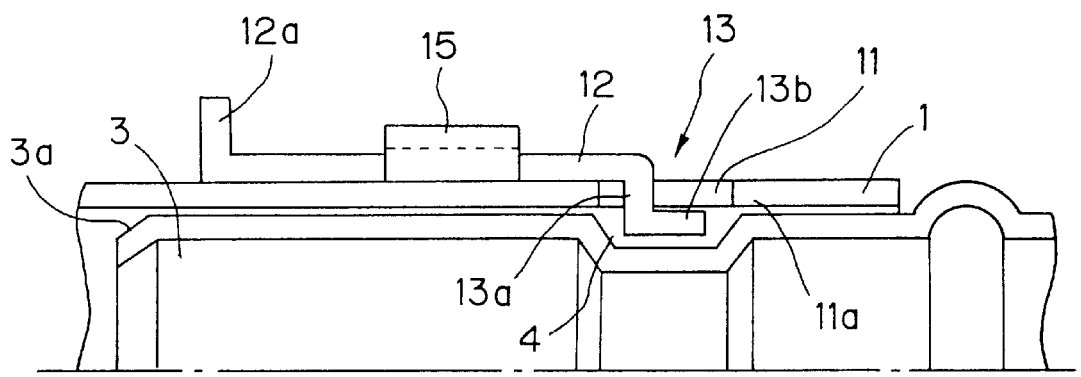
FIG. 4(a) is an explanatory view of a third embodiment of the invention where the horizontal end of the lock member is located under the cut window where radial displacement would be permitted.
Figure 4B:
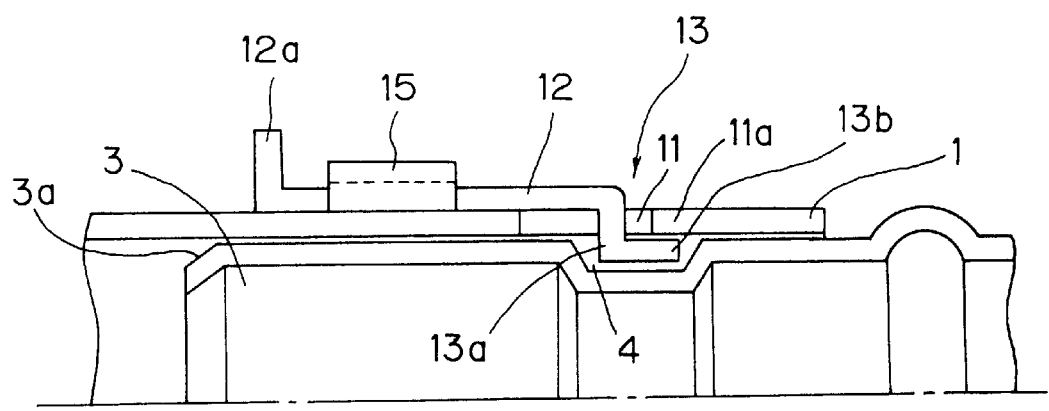
FIG. 4(b) is an explanatory view of a third embodiment of the invention where the horizontal end of the lock member is located under the brim of the cut window where radial displacement would be constrained by the wall of the faucet.

The third embodiment forms the cut window 11 on the side of faucet 1 as shown in FIGS. 4(a) and 4(b), and moreover mounts for a free slide the lock member 12 forming the lock portion 13 consisting of the perpendicular portion 13a and the horizontal end 13b on the outside of this cut window 11. For information, in FIG. 4, because the same symbols with those of FIG. 2 indicate the same portions and the same functions, their explanations are omitted.

In the third embodiment, when the insertion port 3 side should be inserted into the stipulated position inside the faucet 1 of another pipe, the circumference groove 4 confronts with the said cut window 11, and the lock portion 13 of lock member 12 falls down into the circumference groove 4 (FIG. 4(a)). After that, if the insertion port 3 side should be pulled a bit, the lock member 12 advances together, and the horizontal end 13b of lock portion 13 enters in the wedge status inside the brim 11a of cut window 11 (FIG. 4(b)). The pipe can be locked in this status. The action of pulling out the pipe is identical to that of the first and second embodiments.

Figure 5:
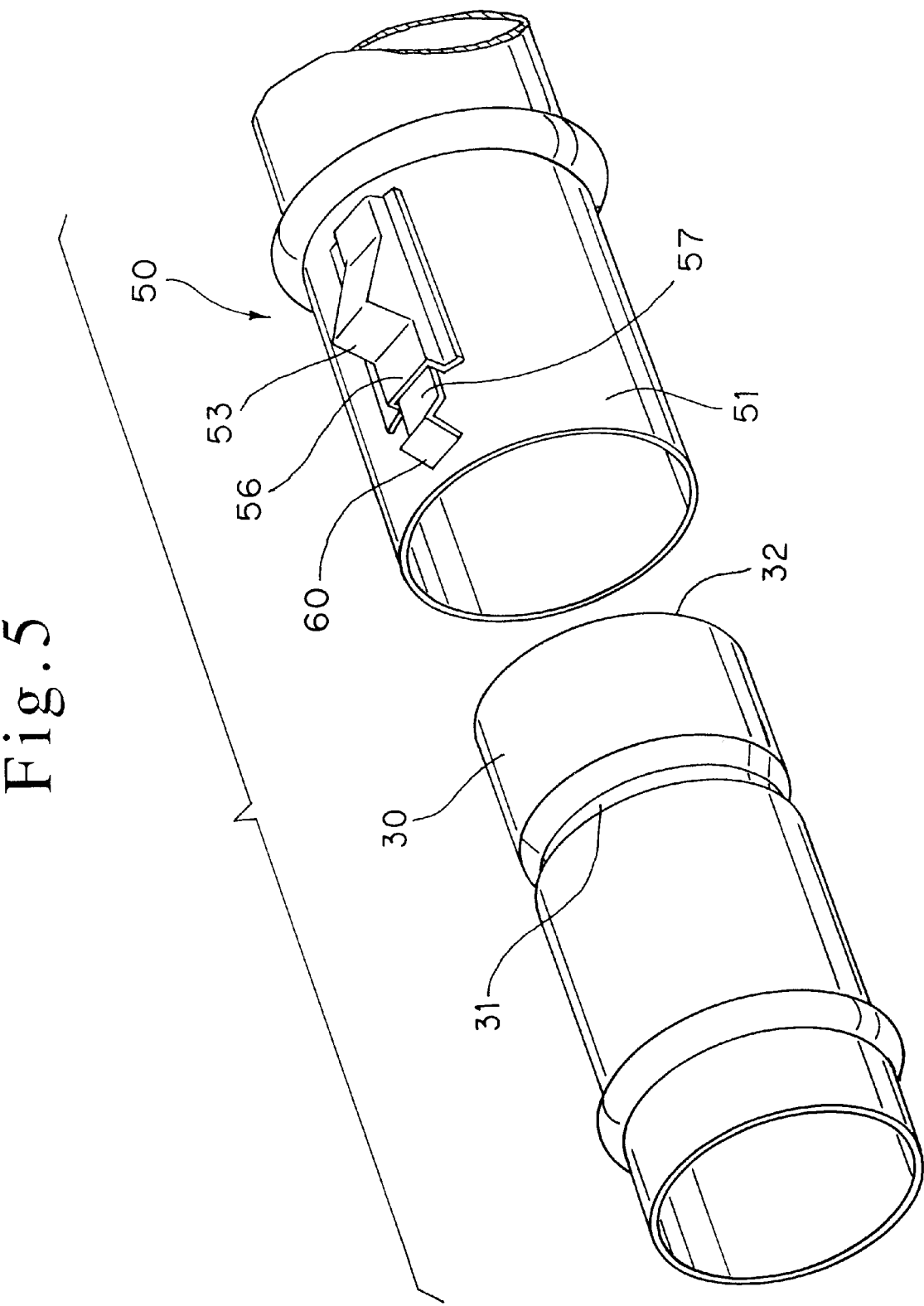
FIG. 5 is an explanatory view of slip-out preventive unit relating to a fourth embodiment of the invention.

The fourth embodiment of the invention is shown in FIG. 5, and its concrete structure and operation mode example is shown in FIG. 6 through FIG. 9. First, Numeral 50 in FIG. 5 is the slip-out preventive unit according to this invention, and a cut window 52 (see FIG. 6) is provided to the side of faucet 51 of this unit 50. The escape space 54, the lock wall 55 and the cover 53 forming the slide guide 56 are mounted to the outside of this cut window 52. Numeral 57 is the lock member made of elastic body, and this lock member 57 not only positions the engagement portion 59 at the tip of lock portion 58 bent to a U-letter shape between the escape space 54 and the cut window 52, but is also held for a free slide by the slide guide 56 formed to the cover 53. The lock portion 58 of lock member 57 presents a U-letter shape in this embodiment, but may also be a V-letter shape or a ⌴shape, and this shape will not be especially limited.

On the other hand, the circumference groove 31 which is positioned inside the cut window 52 and with which the lock portion 58 of said lock member 57 gets engaged when the insertion port 30 side has been inserted into the stipulated position inside the faucet 51 of another pipe has been formed on the side of insertion port 30, and this structure is identical to the structure of conventional insertion port. Further, the circumference groove 31 in this embodiment has been formed to a reversed trapezoid in its cross section but may be a semicircular shape.

The connection and pullout examples of pipe in this embodiment are to be explained with reference to FIG. 6 through FIG. 9.

Figure 6:
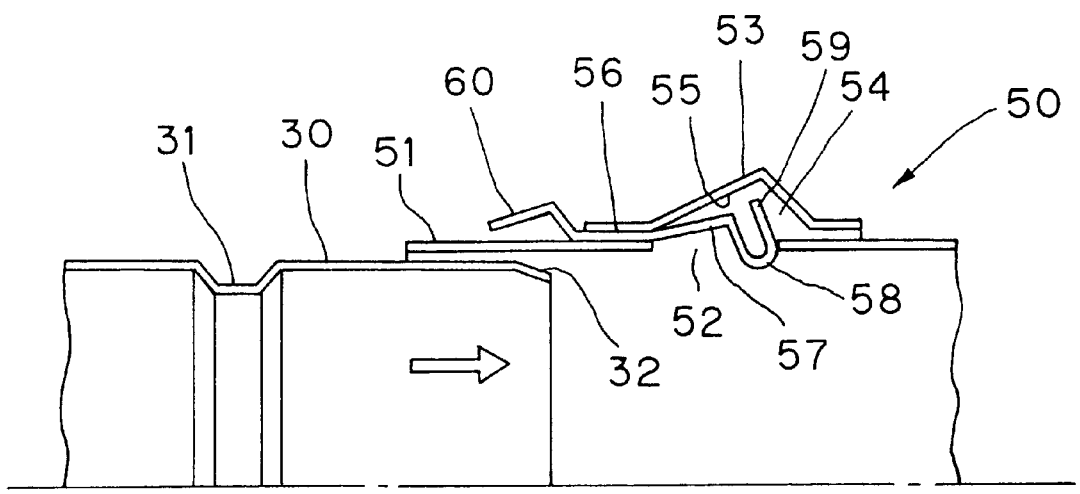
FIG. 6 is an explanatory view of slip-out preventive unit structure and its action relating to the fourth embodiment of the invention.
Figure 7:
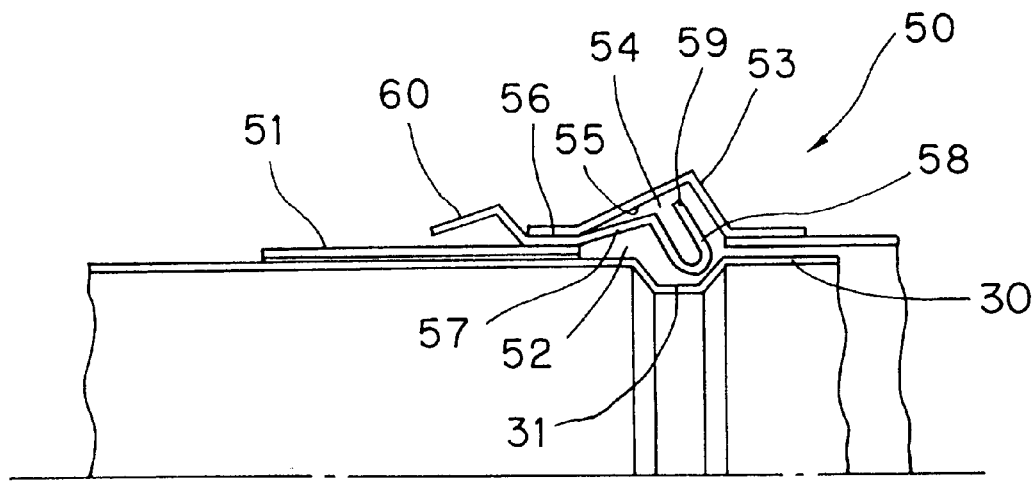
FIG. 7 is an explanatory view of slip-out preventive unit structure and its action relating to the fourth embodiment of the invention.
Figure 8:
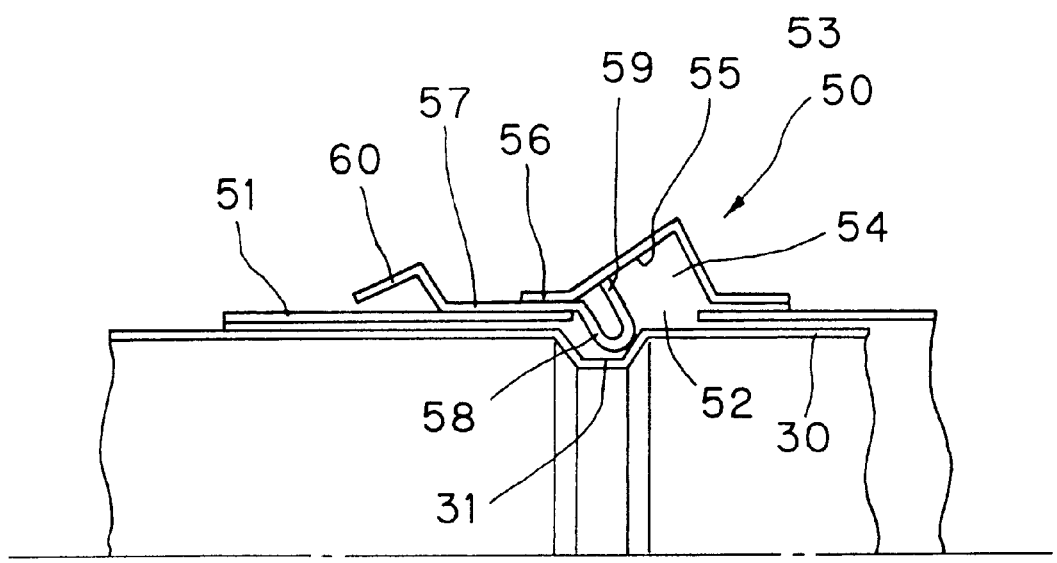
FIG. 8 is an explanatory view of slip-out preventive unit structure and its action relating to the fourth embodiment of the invention.

First, if the insertion port 30 side of another pipe should be inserted inside the faucet 51 in the status shown in FIG. 6 as it is when connecting the pipe, the tip 32 of insertion port 30 gets in touch with the lock portion 58 of lock member 57, and if this lock portion should be pushed as it is, the lock member 57 retracts inside the cover 53 together, and the lock portion 58 gets in contact with the brim of cut window 52 and stops there. If the insertion port 30 side should be further inserted, the lock portion 58 is pushed up by the tip 32 of insertion port 30 and escapes inside the cover 53 from the cut window 52. If the insertion port 30 should be inserted into the stipulated position, the circumference groove 31 mates below the lock portion 58, and the lock portion 58 drops down into the circumference groove 31 due to its elasticity action. The connection may be acceptable as it is, but the insertion port 30 side shall be pulled a bit for sliding the lock member 57 together and moving the lock portion 58 to the side of lock wall 55, and the engagement portion 59 at the tip shall be made contacted with the lock wall 55 (FIG. 8). With this arrangement, because the engagement portion 59 is retained with the lock wall 55 when the force in pullout direction should be applied to the pipe, the wedge effect acts on the lock portion 58, and the fitting relation with the circumference groove can be strengthened.

Figure 9:
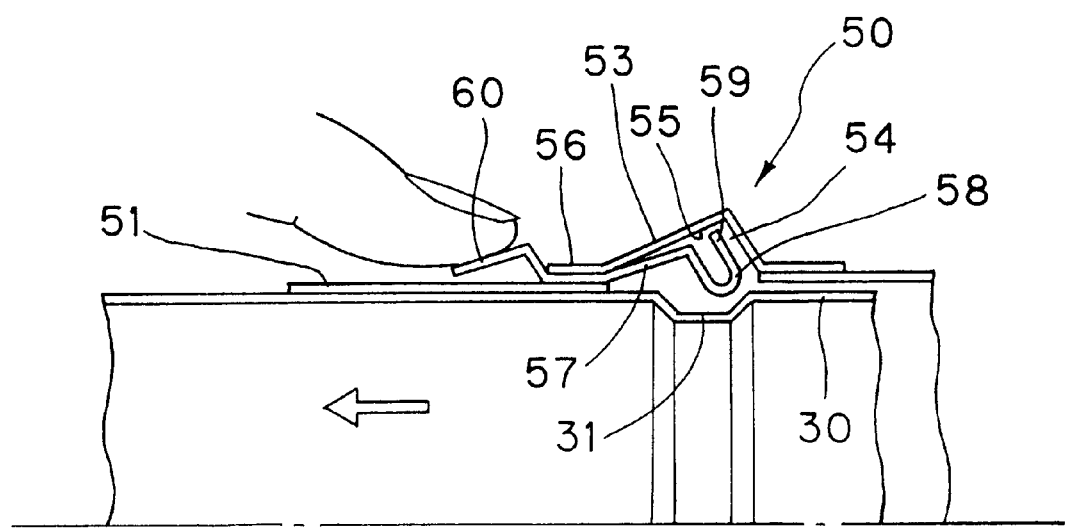
FIG. 9 is an explanatory view of slip-out preventive unit structure and its action relating to the fourth embodiment of the invention.
Figure 10A:
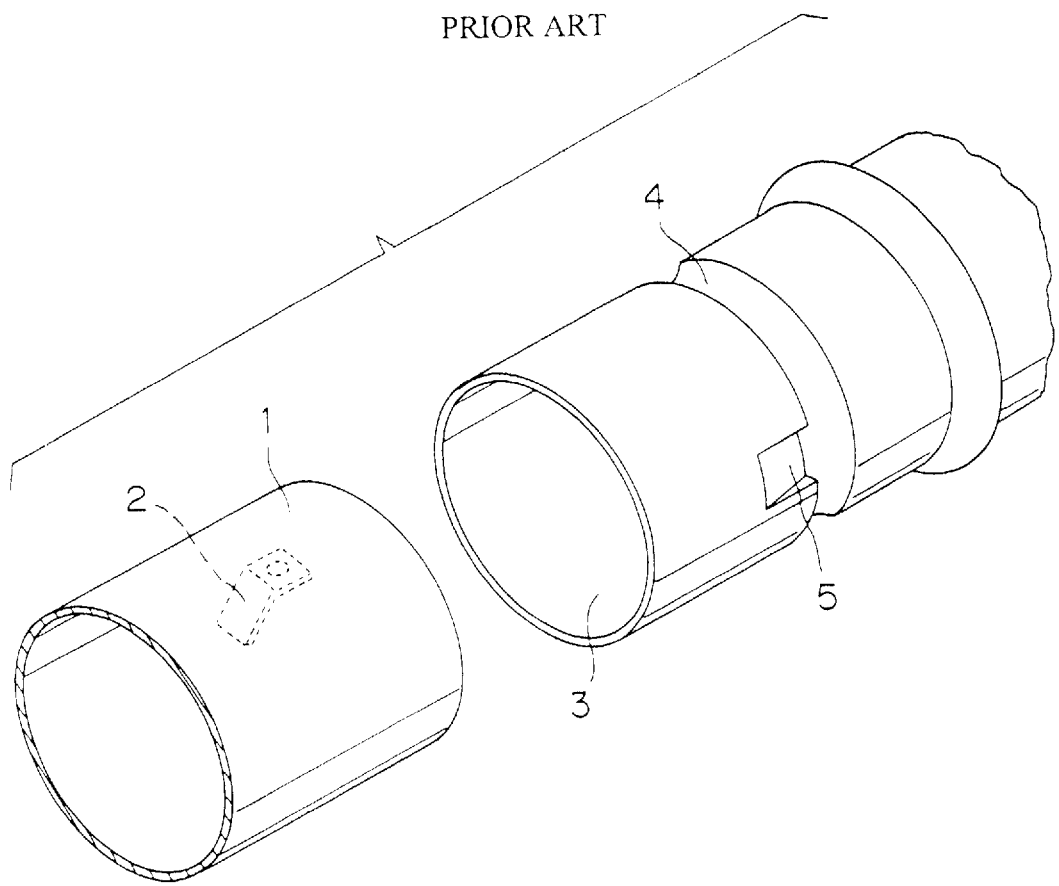
FIG. 10(a) is an explanatory view showing an example of conventional slip-out preventive unit in an un-assembled condition.
Figure 10B:
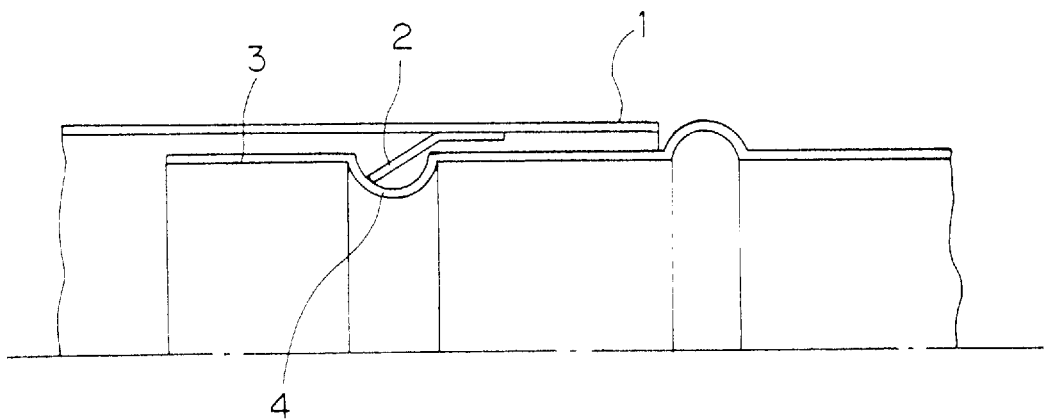
FIG. 10(b) is an explanatory view showing an example of conventional slip-out preventive unit in an assembled condition.
Figure 11A:
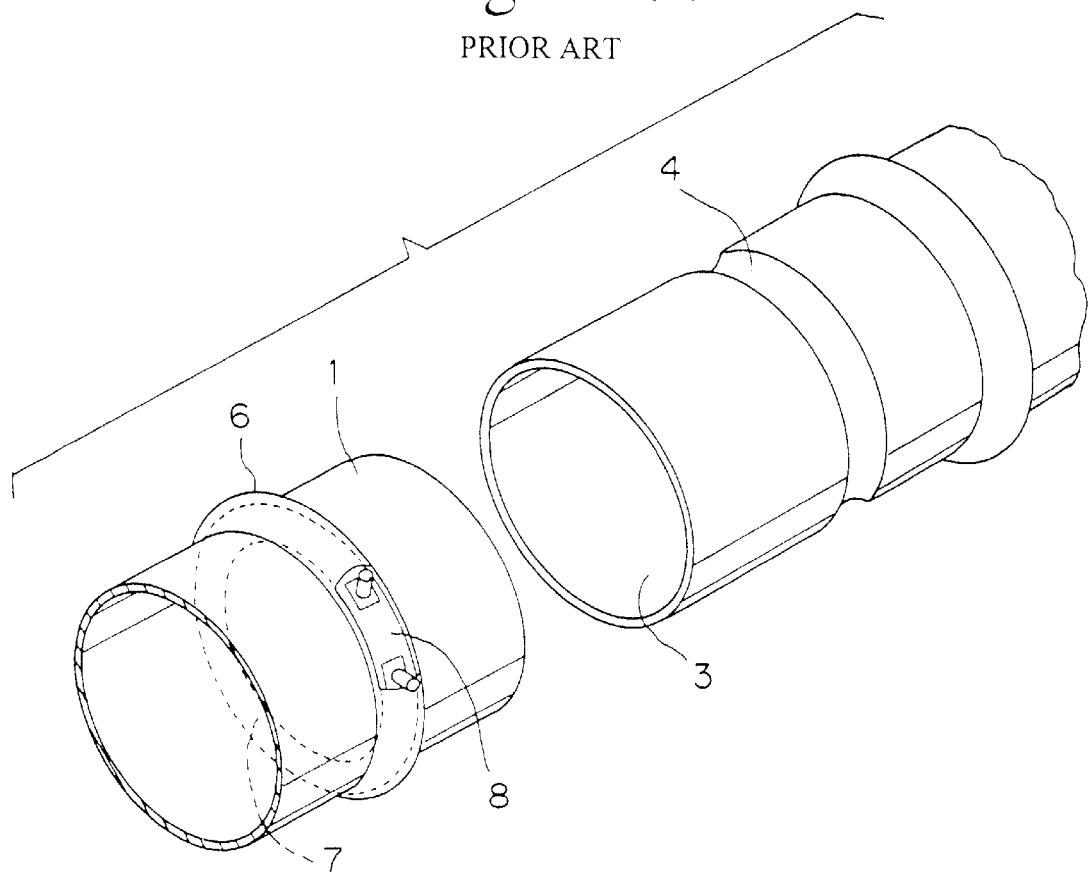
FIG. 11(a) is an explanatory view showing an example of conventional slip-out preventive unit in an un-assembled condition.
Figure 11B:
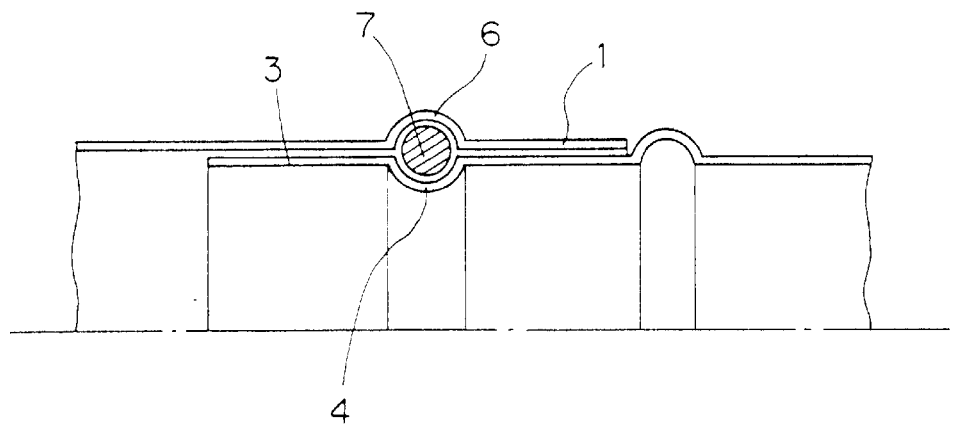
FIG. 11(b) is an explanatory view showing an example of conventional slip-out preventive unit in an assembled condition.

When pulling out the pipe, the insertion port 30 side shall once be pushed in for retracting the lock member 57 together and the engagement portion 59 of lock portion 58 shall be escaped to the side of escape space 54 from the lock wall 55 as shown in FIG. 9. After that, if the stopper control portion 60 of lock member 57 should be retained with the finger tips and the insertion port 30 side should be pulled, the lock portion 58 is raised along the brim of circumference groove 31 and escapes into the escape space 54 from the cut window 52. As a result, the pipe can be pulled out easily as it is.

In this invention, adopting the slip-out mechanism where the wedge effects acts on the lock portion of lock member can drastically enhance the strength against the pullout. In other words, unless the lock member or pipe or the locking bag wall should get deformed or broken, the pipe won't slip out. As a result, a slip-out preventive unit of a supply exhaust pipe which is high in safety can be obtained. Further, the pipe can be locked only be inserting the insertion port side into the faucet, and on the other hand, in pulling out the pipe, the pipe can be pulled out as it is by once pushing in the insertion port side and retaining the lock member, and the pipe can be attached and detached in one touch in any of the cases.

While specific embodiments of the invention have been shown and described in detail to illustrate the application of the principles of the invention, it will be understood that the invention may be embodied otherwise without departing from such principles.

What is claimed is:

1. A slip-out preventive unit of a supply exhaust pipe with a supply exhaust pipe forming a faucet at one end and forming an insertion port at the other end, the slip-out preventive unit comprising:

a cut window provided in the side of the faucet;

a stopper formed to a rear end and to the outside of said cut window;

lock member with a lock portion forming and an engagement portion extending to a tip side, said lock portion being mounted for free sliding in a longitudinal direction of the pipe toward a front end of the pipe, and said lock member being mounted such that said lock member slides in a pipe end direction and the lock portion drops down in the center direction of the pipe from at said cut window, the tip of said engagement portion being engagable from an inside;

a locking bag wall for preventing said tip from escaping in a radial direction, a circumference groove which opposes said cut window and where the engagement portion with the lock portion of said lock member falls down to prevent the slip-out when the faucet of another pipe has been inserted into a stipulated position to the side of an insertion port, and after a pipe has been connected, said lock member being slidable in a pullout direction together with the pipe wherein said tip of said engagement portion of said lock member comes in contact with the locking bag wall when a force in the pullout direction acts on the pipe such that said engagement portion is retained and a pullout prevention strength can be enhanced due to a wedge action of the unit between said locking bag wall and said circumferential groove upon application of a force in the pullout direction, and upon a side of said engagement portion being pushed in for retracting the lock member together and escaping the tip of said engagement portion from said locking bag wall, the pipe can be disconnected by pulling out the insertion port side while retaining with finger tips the stopper formed to the rear end of lock member in this state.

2. A slip-out preventive unit according to claim 1, wherein a cover state escape space is integrally formed on an inlet side of said locking bag wall and a slide guide of said lock member is provided integrally formed therewith.

3. A slip-out preventive unit according to claim 1, wherein said lock portion and said engagement portion of said lock member are formed by bending an elastic plate into one of a V-letter shape, a ⊔ shape or a U-letter shape.

4. A slip-out preventive unit of a supply exhaust pipe with a supply exhaust pipe forming a faucet at one end and forming an insertion port at the other end, the slip-out preventive unit comprising:

a cut window provided in the side of the faucet;

a stopper formed to a rear end on an outside of said cut window;

a lock member forming an engagement portion which is substantially horizontal and with an approximately perpendicular lock portion in a front end direction, the lock member having a substantially L-letter shape and being mounted for free sliding in a pipe axial direction;

a circumferential groove opposing to said cut window when inserted into a position inside the faucet of another pipe, said lock portion of said lock member falling down to prevent a slip-out and formed to a side of an insertion port, wherein after connecting the pipe, said lock member slides in a pullout direction together with said pipe and a horizontal end of said lock portion of said lock member enters into a wedge state inside a brim of said cut window for preventing slip-out when a force in a pullout direction acts on the pipe, and wherein upon pushing the insertion port side for retracting the lock member together and detaching said horizontal end from inside of said brim of said cut window said pipe can be disconnected by pulling out the insertion port side while retaining the stopper formed to the rear end of lock member.

5. A slip-out preventive unit of a supply exhaust pipe with a supply exhaust pipe forming a faucet at one end and forming an insertion port at the other end, the slip-out preventive unit comprising:

a cut window provided in the side of the faucet and an escape space and a lock wall are also formed in an interior of said cut window;

a cover is mounted forming a slide guide portion towards a tip side of the faucet;

a lock member with a lock portion held by said slide guide portion of said cover and with an engagement portion formed adjacent a tip of said lock portion, said lock portion being slidable freely in a pipe axial direction and formed extending to a tip portion inside the escape space inside said cover with a control portion exposed to said tip side of faucet from the cover and said lock member;

a circumferential groove that opposes said window, said lock portion of said lock member extending down to prevent a slip-out when the faucet of another pipe has been inserted into a position, wherein after connecting the pipe, said lock member slides in a pullout direction together with said pipe and said engagement portion comes in contact with said lock wall inside the cover when a force in pullout direction acts on the pipe with the displacement of said lock portion being retained to stop the pullout, and wherein said engagement portion escapes into said escape space from the lock wall by pushing in the insertion port side and retracting the lock member together, whereby the pipe can be disconnected by pulling out the insertion port side while retaining the control portion of the lock member.

6. A slip-out preventive unit according to claim 5, wherein wherein said lock portion of said lock member is formed by bending an elastic plate into a V-letter shape, a ⊔ shape or a U-letter shape.

* * * * *